Dec. 4, 1956        F. L. HOPKINS        2,772,847
APPARATUS FOR FEEDING BULK MATERIAL AND CONTROL THEREFOR
Filed Jan. 14, 1955        3 Sheets-Sheet 1
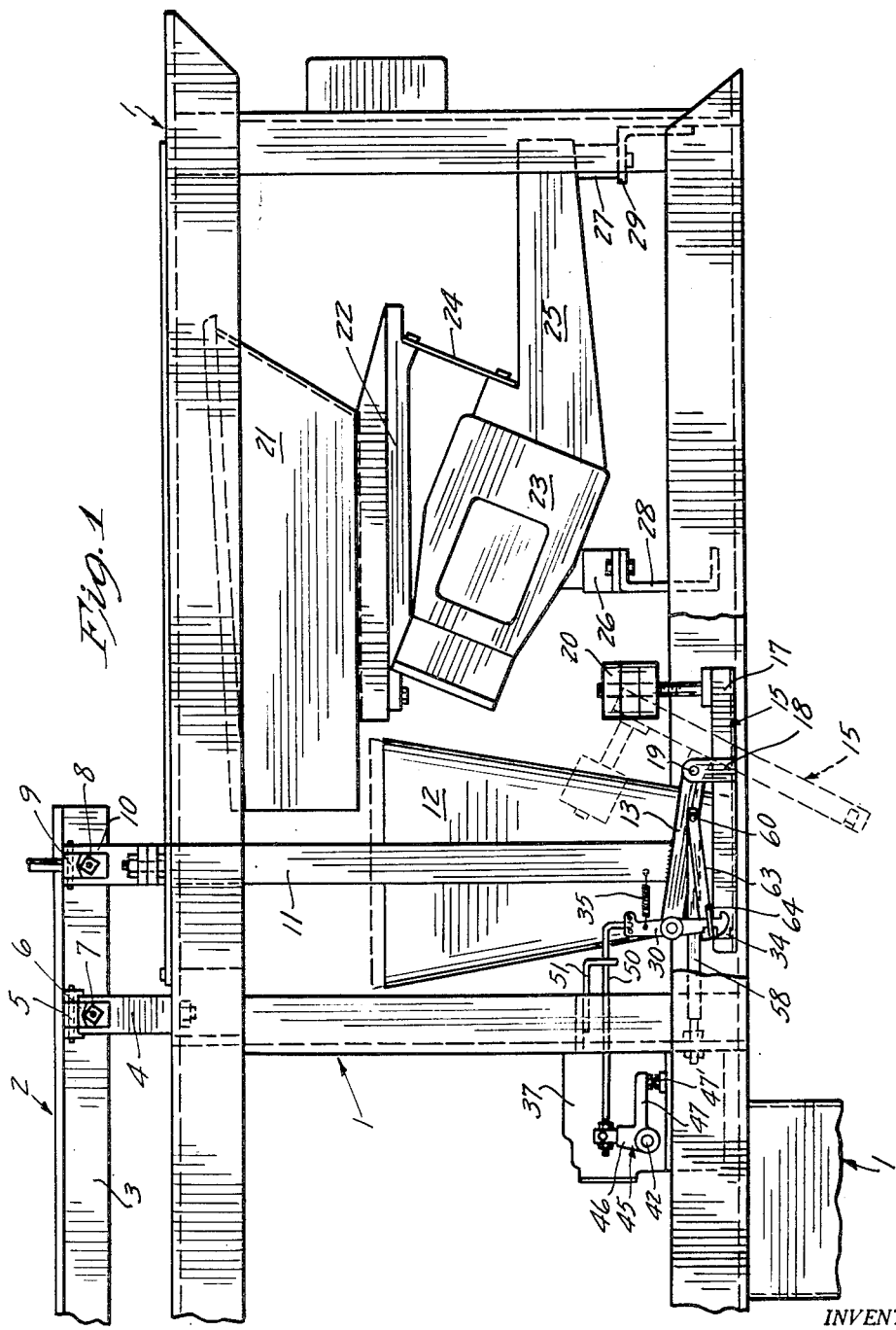
INVENTOR.
*Frank L. Hopkins*
BY
*Merchant & Merchant*
ATTORNEYS

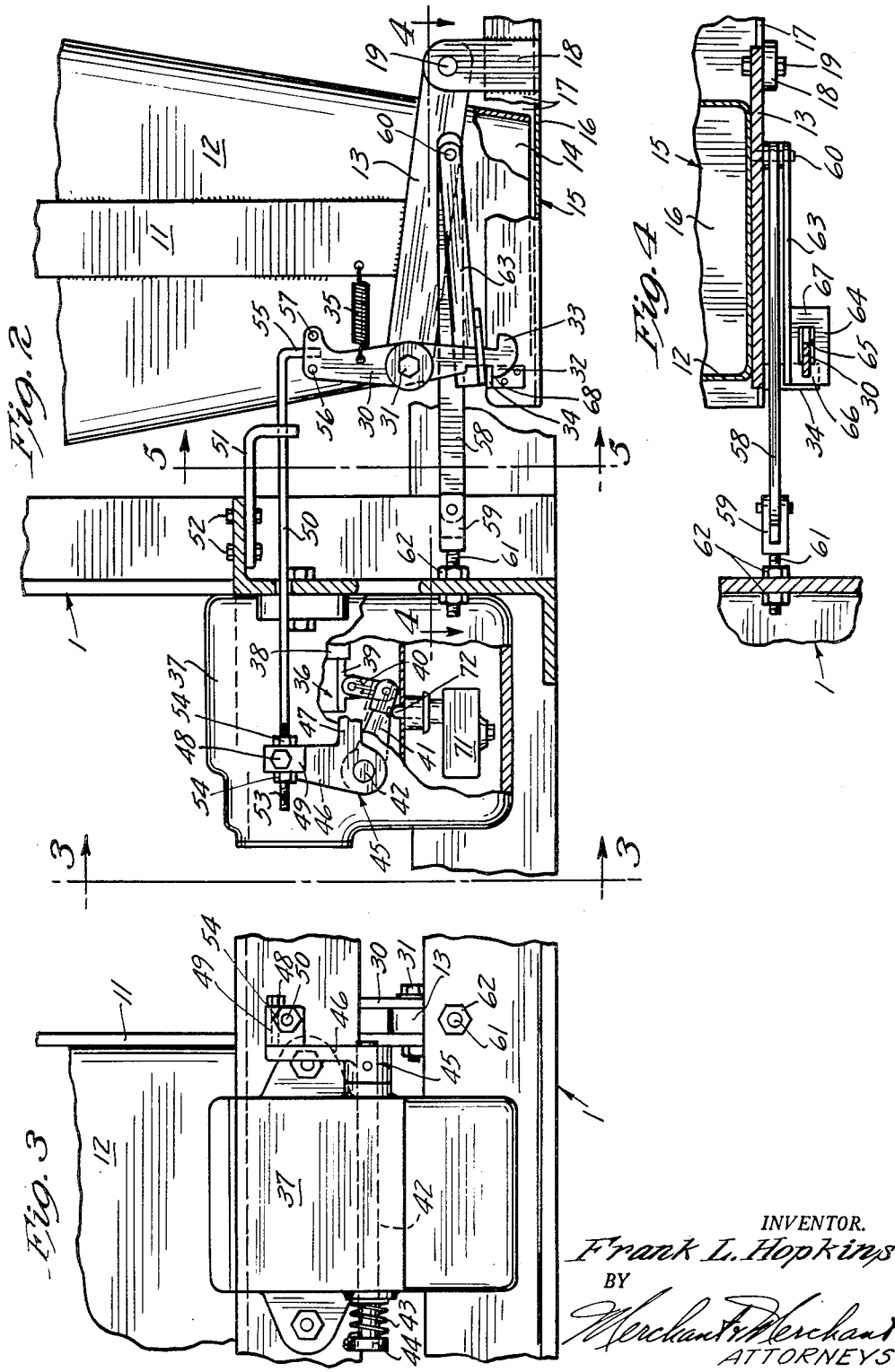

Dec. 4, 1956  F. L. HOPKINS  2,772,847
APPARATUS FOR FEEDING BULK MATERIAL AND CONTROL THEREFOR
Filed Jan. 14, 1955  3 Sheets-Sheet 3
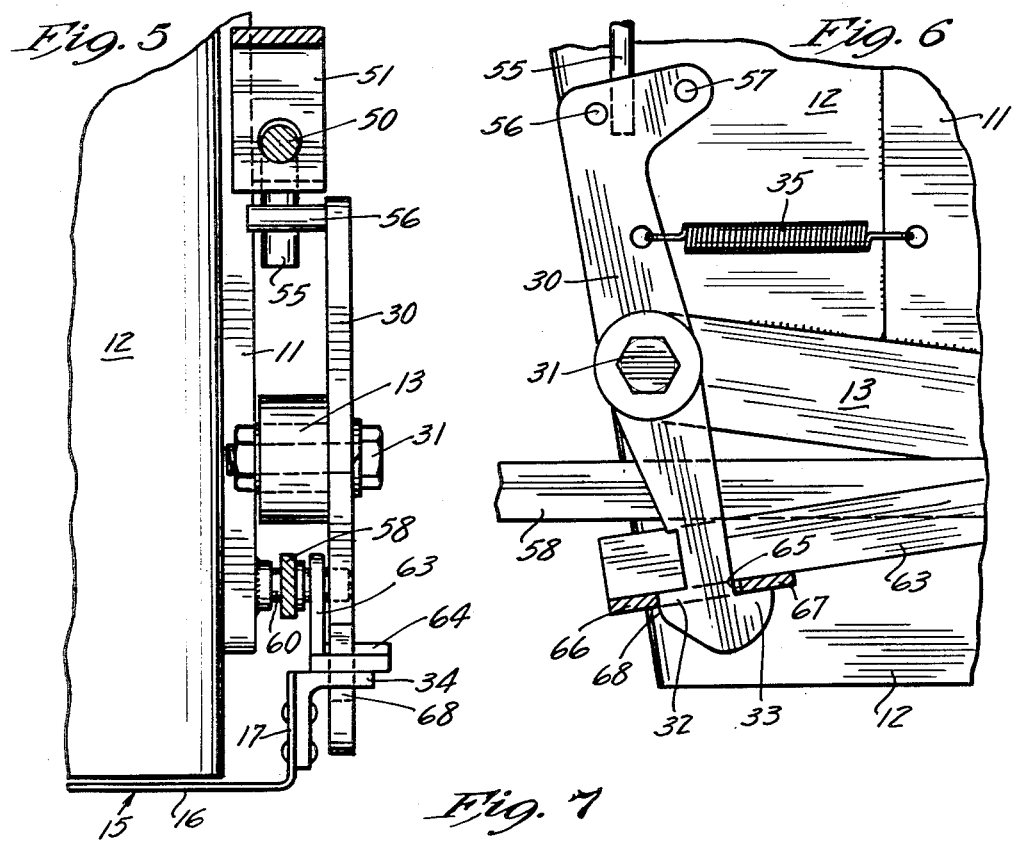
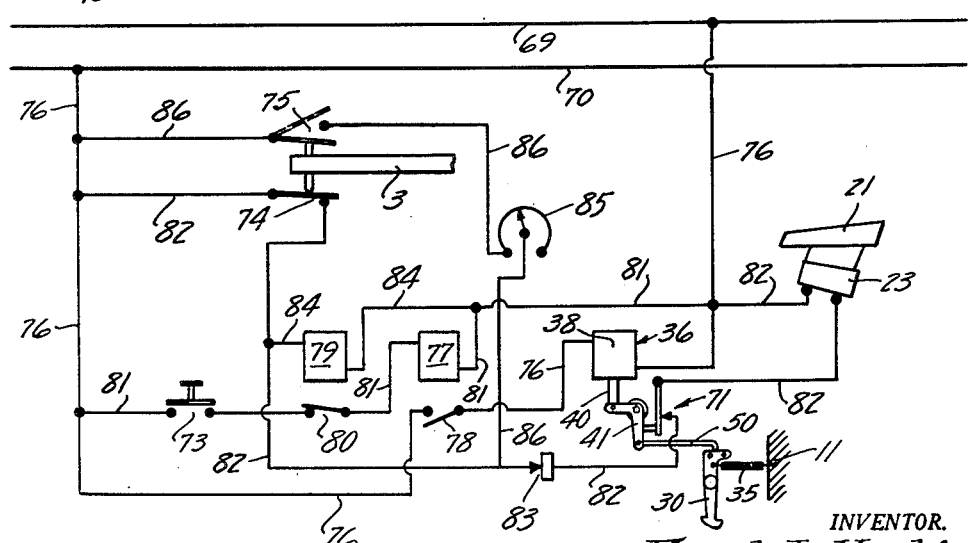
INVENTOR.
Frank L. Hopkins
BY
Merchant & Merchant
ATTORNEYS United States Patent Office 2,772,847
Patented Dec. 4, 1956

2,772,847

APPARATUS FOR FEEDING BULK MATERIAL AND CONTROL THEREFOR

Frank L. Hopkins, Minneapolis, Minn., assignor to Bemis Bro. Bag Co., St. Louis, Mo., a corporation of Missouri Application January 14, 1955, Serial No. 481,948

7 Claims. (Cl. 249—45)

My invention relates generally to devices for measuring and dispensing predetermined quantities by weight of granular or powdered material, and more particularly to improvements in mechanisms for controlling devices of this type.

An important object of my invention is the provision of novel means whereby a maximum of weighing time for the material to be dispensed is obtained for each cycle of operation of the machine.

Another object of my invention is the provision of a machine as set forth having a weighing hopper and novel means for controlling the feeding of material to the hopper.

Still another object of my invention is the provision of a weighing hopper for a machine as set forth having a gate controlling the discharge of material from the weighing hopper, and of novel latch mechanism therefor.

A still further object of my invention is the provision of a machine of the above type having a weighing hopper and a gate controlling the discharge of material therefrom, and of novel means whereby feeding of the material to the weighing hopper is dependent upon proper latching of the gate in a closed position.

The above, and still further highly important objects and advantages of my invention, will become apparent from the following detailed specification, appended claims and attached drawings.

Referring to the drawings, which illustrate the invention, and in which like characters indicate like parts throughout the several views:

Fig. 1 is a fragmentary view in side elevation of a machine built in accordance with my invention;

Fig. 2 is an enlarged fragmentary view in side elevation of a portion of Fig. 1, some parts being broken away and some parts shown in section;

Fig. 3 is a fragmentary view in side elevation as seen from the line 3—3 of Fig. 2;

Fig. 4 is a fragmentary horizontal section taken substantially on the line 4—4 of Fig. 2;

Fig. 5 is an enlarged fragmentary detail partly in section and partly in elevation taken substantially on the line 5—5 of Fig. 2;

Fig. 6 is a fragmentary view in side elevation as seen from the right to the left with respect to Fig. 5, some parts being broken away and some parts shown in section; and Fig. 7 is a wiring diagram.

The machine of the instant invention is adapted for use in the weighing and dispensing of any powdered or granular material in bulk form, but is primarily intended for use in weighing out predetermined quantities of various granular materials in the packaging of ready-to-use concrete or plaster mixtures. In the packaging of such mixtures, a plurality of weighing devices are utilized, each of such devices measuring out a different ingredient such as sand, gravel and powdered cement. Inasmuch as the several weighing devices in a given machine of my invention are similar in structure and operation, but one thereof is herein illustrated and described. Sources of supply, such as supply hoppers and conduits leading therefrom, together with conduit means for guiding various weighed materials to the packages or containers in which the materials are placed, are omitted from the drawings, inasmuch as these components are of conventional structure and in themselves do not comprise the instant invention.

Referring now with greater detail to the drawings, the numeral 1 indicates, in its entirety, a supporting frame structure which carries weighing scale mechanism 2, including a beam 3, mounted for rocking movements on an upright supporting member 4. As shown more or less diagrammatically in Fig. 1, the beam 3 is provided with a bearing element 5 which is provided at its bottom with an inverted V-shaped notch 6 which receives an edge portion of a supporting bearing 7 that defines a fulcrum for the beam 3. At one end, the beam 3 is provided with a bearing element 8, similar to the fulcrum-forming member 7, which engages a notched bottom surface of a bearing element 9, similar to the bearing element 5. The bearing element 9 is secured to the bifurcated end 10 of a depending hanger member 11 which is welded or otherwise rigidly secured to an open-topped weighing bucket or hopper 12. Although not shown, it may be assumed that a second bearing element similar to the element, 8, projects laterally outwardly from the opposite side of the scale beam 3, and that a second hanger member, similar to the hanger member 11, is secured to the opposite side of the weighing hopper 12, and depends from the opposite bearing member, so that the hopper 12 is equally supported on both sides.

Projecting transversely of the hanger members 11 and welded or otherwise rigidly secured to the lower ends thereof, are a pair of cross members 13, one of which is shown. With reference to Fig. 2 it will be seen that the lower end of the hopper 12 is formed to provide a discharge opening 14 that is normally closed by a gate 15. The gate 15 comprises a relatively flat intermediate portion 16 and upstanding flanges 17 at its opposite sides. A pair of bearing brackets or the like 18, one of which is shown, extend upwardly from the side flanges, and at their upper ends are pivotally secured to the rear ends of the transverse members 13 as indicated at 19, whereby the gate 15 is movable from a normally closed position, shown by full lines in Figs. 1 and 2, and an open position illustrated by dotted lines in Fig. 1. With reference to Fig. 1, it will be seen that the gate 15 extends rearwardly beyond the mounting brackets 18, and has secured to its rear end portion a counterweight 20 which yieldingly urges the gate 15 toward its normal gate-closed position underlying the discharge opening 14 in the hopper 12. The yielding bias of the counterbalance 20 is sufficient to close the gate 15 when the hopper is empty, but insufficient to overcome the weight of a given quantity of material delivered to the hopper 12. In other words, said given quantity of material in the hopper is sufficient to cause the gate 15 to open against the yielding bias of the counterweight 20, as will hereinafter be described in detail.

Means for feeding powdered or granular material to the hopper 12 comprises a feeding tray 21 which is secured to a vibratory frame 22 connected to an electromagnetic vibrator 23 by means including a resilient strip or plate 24. The vibrator includes a frame 25 and front and rear feet 26 and 27 that are bolted or otherwise secured to cross frame members 28 and 29 respectively of the frame structure 1. The feeding tray 21 and vibratory motor 23 therefor, together with the means for mounting the same to the frame structure, are well known to those skilled in the art of feeding granular or powdered materials, and it is believed not necessary to illustrate and describe the same in greater detail. It will also be assumed that material is conveyed to the feeding tray 21 from a suitable source of supply, such as a supply hopper, not shown. It will be noted that the open front end of the tray 21 overlies the open upper end of the weighing hopper or bucket 12 so that material being fed by the tray 21 will fall into the hopper 12 under the action of gravity.

For the purpose of locking the gate 15 in its horizontal closed position, I provide a latch lever 30 pivotally mounted intermediate its ends to the front end of one of the cross members 13, as indicated at 31. The lower end of the latch lever 30 is formed to provide a pair of laterally spaced hook elements 32 and 33, the former of which is adapted to engage a strike element 34 rigidly secured to the adjacent side flange 17 of the gate 15 to hold the gate 15 in its closed position. A coil tension spring 35 has its opposite ends connected to the latch lever 30 and the lower end portion of one of the adjacent hanger members 11, and yieldingly biases the latch lever 30 toward engagement of its hook element 32 with the strike 34.

Obviously, pivotal movement of the latch lever 30 in a counterclockwise direction with respect to Figs. 1 and 2, against bias of the spring 35, causes the hook element 32 to be disengaged from the strike 34, whereby to permit the gate 15 to open and permit discharge of the material from the hopper 12. Means for tripping the latch lever 30 to permit opening of the gate 15 comprises a solenoid 36 that is contained within a housing 37 bolted or otherwise rigidly secured to the frame structure 1. The solenoid 36 includes an electromagnetic coil 38 and a cooperating armature 39 to which is attached one end of a link 40, the other end of which is pivotally connected to the outer end of a crank arm 41, the inner end of which is rigidly secured to a rock shaft 42 that extends transversely through the housing 37, and which is journalled in opposite side walls thereof. A torsion spring 43 encompasses a projecting end 44 of the shaft 42 and has one end rigidly secured thereto, its other end being suitably anchored to the solenoid housing 37, whereby to yieldingly bias the shaft 42 in a direction of rotation clockwise with respect to Figs. 1 and 2. Energization of the solenoid 36 causes the crank arm 41 to rotate the rock shaft 42 in a counterclockwise direction against bias of the torsion spring 43. A bell crank 45 is rigidly secured to the opposite end of the rock shaft 42 and comprises angularly disposed arms 46 and 47, to the former of which is pivotally secured, by means of a bolt or the like 48, a lug 49. An elongated, rigid trip arm 50 is mounted for longitudinal sliding movements in a guide bracket 51 anchored to the frame structure 1 by bolts or the like 52, and has one screw-threaded end 53 projecting through the lug 49. The trip arm 50 is locked in adjusted set position to the lug 49 by lock nuts 54 screw threaded on the threaded end portion 53 and disposed against opposite sides of the lug 49. The opposite end of the trip arm 50 is formed to provide a downturned end portion 55 which is disposed between a pair of laterally spaced pins 56 and 57 which extend transversely from the upper end portion of the latch lever 30. With reference particularly to Figs. 2 and 6, it will be seen that the pins 56 and 57 are spaced apart a distance slightly greater than the thickness of the downturned end 55 of the trip arm 50, whereby to permit a relatively small degree of lost motion between the latch lever 30 and the trip arm 50.

From the above it should be obvious that, when the solenoid 36 is energized, the trip arm 50 will be moved in a direction to cause the latch lever 30 to be disengaged from the strike 34 to permit the gate 15 to open. The weighing hopper 12, being suspended from the scale beam 3, partakes of limited vertical movements during the filling and emptying thereof, and would normally be subject to undesirable lateral swinging movement under the latch operating movement of the trip arm 50 when the solenoid 36 is energized. To permit limited vertical movement of the weighing hopper 12 and to prevent lateral swinging movement thereof, I provide a rigid stabilizer bar 58 which is pivotally secured at one end to a bifurcated anchoring bracket or the like 59, and, which at its other end is pivotally secured to an anchoring pin 60 projecting laterally outwardly from the adjacent cross member 13. The anchoring bracket 59 is provided with a forwardly projecting stud 61 which extends through a portion of the frame structure 1, and which is held in adjusted set position by means of lock nuts 62, see Figs. 2 and 4.

For a purpose which will hereinafter appear, I provide means for locking the latch lever 30 in its tripped position, said means comprising a locking bar 63 which is pivotally secured at one end to the anchoring pin 60, and which at its outer end is formed to provide an outer flange 64 having a slot 65 therein, through which the lower end of the latch lever 30 projects. The slot 65 divides the flange 64 into front and rear lugs 66 and 67 respectively, the former of which is adapted to rest on the strike element 34 when the gate 15 is in its closed position, and the latter of which is adapted to rest upon the hook element 33 of the latch lever 30 when the latch lever 30 is tripped, see Figs. 2 and 6. The hook element 32 defines an abutment portion 68 which engages the adjacent lug 66 when the latch lever 30 is tripped and the gate 15 is opened, whereby to releasably lock the latch lever 30 in its tripped position, the locking arm 63 moving downwardly under the action of gravity responsive to opening of the gate 15. It will be noted, particularly with reference to Fig. 6, that the hook element 33 is slightly lower than the hook element 32, so as to permit the adjacent side edge of the lug 66 to engage the abutment surface 68 of the latch lever 30 when the lug 67 is in operative engagement with the hook element 33. Thus, the locking bar 63 holds the latch lever 30 in its tripped position against bias of the spring 35 and that of the torsion spring 43 when the solenoid 36 is deenergized, such deenergization causing the downturned end 55 of the tripping arm 50 to move into operative engagement with the pin 57 of the latch lever 30. Closing movement of the gate 15, after the hopper 12 is emptied, causes the strike 34 to engage the lug 66 and raise the same out of engagement with the abutment portion 68 of the latch lever 30. Thereafter the spring 35 moves the latch lever 30 in a direction to cause latching engagement of the hook element 32 with the strike element 34, to hold the gate closed.

The electromagnetic vibrator or motor 23 is powered by a suitable source of electrical potential such as a power line comprising a pair of power conductors 69 and 70, which are energized by a suitable generator not shown, and is controlled by means including a normally open switch 71. The switch 71 is mounted in the solenoid housing 37 and is provided with an operating button 72 positioned to be engaged by the crank arm 41 when the solenoid 36 is deenergized, whereby to open the switch 71. With reference to the diagram of Fig. 7, it will be seen that operation of the electromagnetic vibrator motor 23 is under control of a normally open manually operated momentary contact switch 73 and a pair of scale beam operated switches 74 and 75. The solenoid 36 is interposed in a lead 76 which has its opposite ends each connected with a different one of the power conductors 69 and 70. Operation of the solenoid 36 is controlled by a relay 77 having a normally open switch 78 interposed in the lead 76 in series with the winding 38 of the solenoid 36. Operation of the relay 77 is controlled by a second relay 79 having a normally closed switch 80 interposed in a lead 81 that is connected at its opposite ends to the lead 76 in parallel arrangement with the solenoid 36 and switch 78. The relay 77 and momentary contact switch 73 are also interposed in the lead 81, so that the relay-operated switch 78 is closed only responsive to coincidental closing of the switches 73 and 80. The electromagnetic vibrator motor 23, the control switch 71, and the scale beam operated switch 74 are all serially interposed in a lead 82 which has its opposite ends connected to the lead 76 in parallel arrangement with the lead 81, and also in parallel arrangement with that portion of the lead 76 in which the solenoid 36 and relay-operated switch 78 are interposed. A rectifier 83 is also interposed in the lead 82 between the control switch 71 and the scale beam operated switch 74. The relay 79 is interposed in a lead 84 that is connected at one end to the lead 82 between the switch 74 and rectifier 83, and at its other end to the lead 81 between the relay 77 and the connection of the lead 81 to lead 76 adjacent the power line 69. The scale beam operated switch 74 and lead 82 conduct full line voltage to the rectifier 83, so that during the closed position of the switch 74, the vibrator motor 23 operates at full speed to cause delivery of material to the weighing hopper 12 at relatively high speed. For the purpose of slowing down the speed of filling of the weighing hopper 12 during the final filling operation thereof, I provide a rheostat 85 which is interposed in a lead 86 in series with the scale beam operated switch 75. The lead 86 is connected at one end to the lead 76 adjacent the power conductor 70, and at its other end to the lead 82 between the switch 74 and the rectifier 83. With this arrangement, when the control switch 71 and beam operated switch 74 are closed, the motor 23 is operated at relatively high feeding speed. Then, when the weight of the material within the weighing hopper 12 approaches its maximum, the beam 3 moves to open the switch 74 and close the switch 75. This closing of the switch 75 causes the circuit to the motor 23 to be closed through the rheostat 85, whereby the motor 23 operates at a considerably lower feeding speed to bring the contents of the hopper 12 to the precise desired weight. At this point the switch 75 will be caused to reopen under continued upward movement of the scale beam 3, and all circuits to the electromagnetic motor 23 will be broken. It should be noted that, when the switch 74 is opened, the relay 79 becomes de-energized to cause closing of the switch 80.

With the weighing hopper 12 filled to the desired extent and all circuits to the vibratory motor 23 being broken, the operator closes the momentary contact switch 73 to energize the relay 77 and cause closing of the relay-operated switch 78, energizing the solenoid 36. Energization of the solenoid 36 causes the same to simultaneously open the control switch 71 and trip the latch lever 30 to permit opening of the gate 15 and dumping of the contents of the weighing hopper 12. The operator, having once caused energization of the solenoid 36, may release the switch 73, the armature 39, the crank arm 41, tripping arm 50 and latch lever 30 being held in their latch tripped position by engagement of the lug 66 on the locking bar 63 with the abutment portion 68 of the latch lever 30. As above indicated, this engagement will be held until the hopper 12 is empty and the gate 15 returns to its normal closed position. It will be noted, with reference to Fig. 1, that when the gate 15 is open to its dotted line position, the center of gravity of the gate 15 and counterbalancing weight 20 is considerably closer to the vertical plane of the axis of swinging movement of the gate 15 than when the gate is in its closed position. This arrangemnt permits the gate to move sufficiently slowly during its initial closing movement to permit all of the material to be dispensed from the weighing hopper 12 before the gate recloses. It will be further noted that, as soon as the weighing hopper 12 is relieved of the weight of material, the scale beam 3 will move to close the switch 74, and that upon closing of the gate 15, the latch lever 30 and the several latch tripping elements will be released, causing the control switch 71 to be closed by engagement of the crank arm 41 with the switch actuating button 72. Obviously, this reclosing of the switch 71 will cause immediate energization of the vibratory motor 23 to start a new filling cycle. Thus, the hopper filling cycle is initiated with a minimum loss of time. It should also be noted that, in the event that the gate 15 does not close sufficiently to cause release of the latch and operative engagement between the latch hook 32 and the strike 34, the control switch 71 will not be energized to initiate the filling operation. Thus, possible waste of material is avoided.

It will be observed, with reference to Figs. 1 and 2 that the outer end of the arm 47 of the bell crank 45 is engageable with the head of a lock nut-equipped adjustment screw 47' for the purpose of properly positioning the rock shaft 42 and crank arm 41 with respect to the actuator button 72 of the control switch 71. Preferably, this control switch 71 is of the sensitive type commonly known as a "micro switch," and utilizes very slight movement of the actuator button 72 for its operation. With the above-mentioned adjustment, the timing of the switch 71 may be varied between relatively close limits.

As above indicated, several filling hoppers may be used to dispense different materials in predetermined quantities to provide a given aggregate. When this is done, each of the several weighing hoppers, have individual weighing scales and control circuits. However, a single momentary contact switch 73 controls the several latch-operating solenoids, so that, when all of the hoppers are brought up to weight, they are emptied simultaneously, after which their individual solenoid operated control switches initiate their respective filling operation.

My invention has been thoroughly tested and found to be completely satisfactory for the accomplishment of the objectives set forth; and while I have shown and described a commercial embodiment of my novel device, it will be understood that the same is capable of various modifications, and that modification may be made within the spirit and scope of the invention as defined in the claims.

What I claim is:

1. In a machine for weighing and dispensing bulk material; a hopper having a discharge opening in its bottom portion; power operated mechanism for causing material to be fed to said hopper; a gate normally closing said discharge opening; a latch element and a cooperating strike element, one operatively mounted on said hopper and the other operatively mounted on said gate; mechanism for tripping said latch element to cause opening of the gate; a locking element engaging said latch element to releasably lock said latch element in its tripped position when the gate is open; and control means for said power operated mechanism including a control element operated by said latch tripping mechanism to render the power operated mechanism inoperative responsive to latch tripping movements of said tripping mechanism, and to render the power operated mechanism operative responsive to release of the latch element by the locking means therefor upon closing of said gate.

2. In a machine for weighing and dispensing bulk material; a hopper having a discharge opening in its bottom portion; power operated mechanism for causing material to be fed to said hopper; a gate carried by said hopper for movements toward and away from said discharge opening and normally closing said opening; a latch element pivotally carried by said hopper; a cooperating strike element mounted on said gate for common movements therewith; mechanism for tripping said latch element to cause opening of the gate; a locking element engaging said latch element to releasably lock said latch element in its tripped position when the gate is open; and control means for said power operated mechanism including a control element operated by said tripping mechanism to render the power operated mechanism inoperative responsive to latch tripping movements of said tripping mechanism, and to render the power operated mechanism operative responsive to release of the latch element by the locking means therefor upon closing of said gate, movement of said gate toward its closed position causing said strike element to engage and move said locking element in a direction to release the latch for engagement with said strike.

3. In a machine for weighing and dispensing bulk material; a weighing scale mounted hopper having a discharge opening in its bottom portion; power operated mechanism for causing material to be fed to said hopper at a predetermined rate; a gate carried by said hopper for movements toward and away from said discharge opening and normally closing said opening; a latch element pivotally carried by said hopper; a cooperating strike element mounted on said gate for common movements therewith; means yieldingly biasing said gate toward its closed position, said means exerting sufficient bias upon said gate to close the same when the hopper is empty but insufficient to hold the gate closed against weight of a predetermined charge of material in the hopper when said latch element is tripped; mechanism for tripping said latch element to cause opening of the gate; a locking element engaging said latch element to releasably lock said latch element in its tripped position when the gate is open independently of said tripping mechanism; and control means for said power operated mechanism including a control element operated by said tripping mechanism to render the power operated mechanism inoperative responsive to latch tripping movements of said tripping mechanism, and to render the power operated mechanism operative responsive to release of the latch element by the locking means therefor upon closing of said gate.

4. The structure defined in claim 2 in which said locking element for releasably locking the latch element in its tripped position comprises a locking bar mounted for swinging movements relative to said latch element, and in which said latch element comprises a lever having spaced hook portions, one of which engages said strike element to hold the gate in its closed position and the other of which engages said locking bar to limit swinging movement thereof in one direction.

5. The structure defined in claim 4 in which said locking bar includes a lug element lying in the path of travel of said strike, said one of the hook portions of said latch defining an abutment which engages said lug upon opening of said gate to lock said latch element in its tripped position, said lug element being engaged by said strike element during closing movement of the gate to cause swinging movement of said locking bar out of locking engagement with said latch element whereby to permit movement of said latch element into latching engagement with said strike element.

6. In a machine for weighing and dispensing bulk material, a supporting frame, scale mechanism including a scale beam mounted on said frame, a weighing hopper loosely suspended from said beam for common limited movements therewith in a vertical direction, power operated mechanism for feeding material into said hopper, said hopper having a discharge opening in its bottom, a gate mounted to said hopper for swinging movements toward and away from a normal generally horizontal position underlying said hopper and closing the discharge opening, a latch pivotally mounted to said hopper and a cooperating strike mounted on said gate for common movements therewith, mechanism for tripping said latch including a tripping arm, means for coupling one end of said tripping arm to said latch for common movements therewith in a horizontal direction but permitting independent movements of said latch in a vertical direction, a latch locking member movable into engagement with said latch upon opening movement of said gate to lock said latch and tripping mechanism in a latch tripped position while the gate is open, a rigid link connecting said hopper to said supporting frame and restraining said hopper against movements in a horizontal direction but permitting limited movements thereof in a vertical direction, and control means for said feeding mechanism including a control element operated by said tripping mechanism to render the feeding mechanism inoperative responsive to latch tripping movements of said tripping mechanism, and to render the feeding mechanism operative responsive to release of the latch element by the locking means therefor upon closing of said gate.

7. In a machine for weighing and dispensing bulk material, a weighing hopper having a discharge opening in its bottom portion, electrically operated mechanism for feeding material to said hopper, a gate mounted for swinging movements toward and away from closing relationship with the discharge opening, means yieldingly biasing said gate toward said closing relationship, said means exerting bias upon said gate sufficient to close the same when the hopper is empty but insufficient to hold the gate closed against weight of a predetermined charge of material in the hopper, a latch and a cooperating strike, one operatively mounted on said hopper and the other operatively mounted on said gate, a latch tripping solenoid, a bell crank operatively connected to said solenoid, a rigid link operatively connected at its opposite ends to said bell crank and latch, means for releasably locking said latch in its tripped position when the gate is open, and control means including a switch engaged by said bell crank and operative to de-energize said electrically operated mechanism responsive to energization of said solenoid, and to energize said electrically operated mechanism upon de-energization of said solenoid and closing of said gate.

References Cited in the file of this patent

UNITED STATES PATENTS

| 1,364,003 | Smith | Dec. 28, 1920 |
| 2,348,372 | Weckerly | May 9, 1944 |